United States Patent Office 3,826,761
Patented July 30, 1974

3,826,761
METHOD OF SEPARATING CATION AND ANION EXCHANGE RESINS
James L. Short, Kenilworth, N.J., assignor to Ecodyne Corporation, Chicago, Ill.
Filed Mar. 1, 1972, Ser. No. 230,696
Int. Cl. B01d 15/06; C02b 1/76
U.S. Cl. 260—2.1 R                                    8 Claims

ABSTRACT OF THE DISCLOSURE

In the method described in U.S. Pat. No. 3,582,504, which is assigned to the assignee of this application, contaminant cation-exchange resin is separated from anion-exchange resin in a contaminant separation zone by delivering an intermediate-density liquid to the resin in an amount sufficient to permit the anion-exchange resin to float and the contaminant cation-exchange resin to sink. The intermediate-density liquid has a density between the densities of the anion and cation-exchange resins. In accordance with the present invention, the intermediate-density liquid is continuously delivered to the resin, and is intermittently withdrawn from a lower portion of the contaminant separation zone. The intermittent withdrawal of liquid produces high flow rates through the resin, and aids in releasing cation-exchange resin that may have been entrained in the bed.

---

Figure 1:
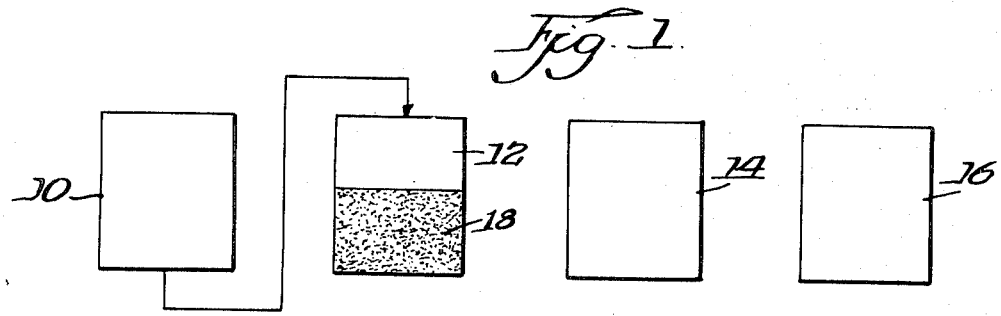

The present invention relates to an improved method for separating contaminant cation-exchange resin from anion-exchange resin.

The U.S. Pat. No. 3,582,504 to Eli Salem et al., which is assigned to the assignee of this application, an improved method is described for separating and isolating cation- and anion-exchange resins from one another. The principal purpose of this method is to overcome the problem of leakage in systems designed for the treatment of water by ion exchange. The term "leakage" refers to any ions that are not removed from the water by the ion exchange resin, and are thus permitted to "leak" past the resin. As used herein, the term "leakage" also refers to any undesired ions such as sodium, which are introduced into the water by the resin itself.

As set forth in the aforementioned patent, the leakage problem arises primarily from the difficulty of obtaining perfect separation of the anion- and cation-exchange resins in a mixed bed prior to regeneration of the resins. As is familiar to those skilled in the art, such separation is conventionally accomplished by passing water upwardly through the resins. This stream of water stratifies the resins by carrying the less dense anion-exchange resin to the top of the separation vessel, while the more dense cation-exchange resin is permitted to sink to the bottom.

While this method is effective for separating the bulk of the resins, in practice complete separation cannot be achieved. A primary source of this difficulty is that resin fines are produced during handling of the resin. Since upflow separation depends upon particle size as well as density, the cation-exchange resin fines will not sink to the bottom of the separation vessel, but will be carried upwardly with the anion-exchange resin. When the resins are subsequently isolated from one another, and the anion-exchange resin is regenerated with sodium hydroxide, sodium ions will be introduced into the ion exchange sites in the cation resin contaminant. When the resins are returned to the service column, the sodium ions will be introduced into the water being treated, producing sodium leakage. This leakage problem is aggravated when ammonium hydroxide is introduced into the stream being treated, as is conventional to prevent corrosion in many applications, since the ammonium ions promote the release of sodium ions from the cation-exchange resin by gradually converting the resin to the ammonium form.

In accordance with the aforementioned Salem et al. patent, the leakage problem is largely overcome by a method which comprises separating the resins in the conventional manner by passing a liquid upwardly through the resins to position the anion-exchange resin in an upper layer and the cation-exchange resin in a lower layer. The layers are then isolated from one another, so that the anion-exchange resin occupies an anion resin zone and the cation-exchange resin occupies a cation resin zone. An "intermediate-density liquid" is then delivered to the anion-exchange resin. This liquid has a density intermediate between the densities of the anion-exchange resin and the cation-exchange resin, that is, greater than the anion-exchange resin and less than the cation-exchange resin. The intermediate-density liquid is delivered to the anion-exchange resin in an amount sufficient to cause the anion resin to float and the cation resin to sink. The anion-exchange resin thus separated is then transferred to another zone so that it is isolated from the cation-exchange resin.

A difficulty which arises in carrying out the general procedure described and claimed in the Salem et al. patent is that the cation-exchange resin fines sometimes are not efficiently released from the anion-exchange resin, particularly when the intermediate-density liquid is a concentrated solution of sodium hydroxide, as in the preferred embodiment of the invention. The reason for this difficulty is that the resin tends to form a compacted bed, and, when the intermediate-density liquid is introduced, the entire bed is floated, while a portion of the cation-exchange resin remains entrained.

Furthermore, when the intermediate-density liquid is sodium hydroxide, it must be relatively concentrated, i.e., around 10–20% by weight. Such a concentrated solution cannot simply be delivered through the anion-exchange resin in a rapid manner to break up the bed without wasting significant quantities of regenerant. However, if the sodium hydroxide solution is delivered slowly through the resin bed, it tends to form channels through the bed, and does not break up the resin mass. This produces two undesirable effects. First, the entrained cation-exchange resin is not entirely released, but remains partially entrained within the compacted mass. Secondly, the regenerant does not efficiently reach all parts of the resin, so that the resin is not fully regenerated.

The problem of cation-exchange resin release also arises when another intermediate-density liquid, such as a sodium sulfate solution, is employed. Again, since the solution must be relatively concentrated in order to have the required density, it cannot be delivered through the resin mass at a high flow rate without substantial wastage occurring.

Generally, the present invention provides an improved method for separating contaminant cation-exchange resin from anion-exchange resin in a contaminant separation zone wherein the foregoing difficulties are overcome. In carrying out the method, the intermediate-density liquid is delivered to the resin in the contaminant separation zone continuously, and is intermittently withdrawn from a lower portion of the zone. This procedure produces intermittent periods of high liquid flow rate through the resin, efficiently breaking up the masss so that entrained cation-exchange resin is released, and so that the intermediate-density liquid reaches all parts of the anion-exchange resin mass.

The invention will be best understood by reference to the following detailed description, taken in conjunction with the drawings, in which:

FIGS. 1–8 are diagrammatic flow charts illustrating the sequential steps of a preferred embodiment of the present invention.

As previously stated, in accordance with the present invention, contaminant cation-exchange resin is separated from the anion-exchange resin by the use of an intermediate-density liquid, which causes the anion resin to float, while permitting any contaminant cation resin to sink to the bottom of the tank. However, in order to prevent entrainment of cation-exchange resin fines in the anion-exchange resin, in accordance with the present invention, the intermediate-density liquid is continuously delivered to the resin, but is intermittently withdrawn from a lower portion of the contaminant separation zone so that intermittent periods of high flow rates through the resin are produced.

In the preferred embodiment of the invention, the intermediate-density liquid is an aqueous solution of sodium hydroxide, since this sodium hydroxide will simultaneously regenerate the anion-exchange resin. However, numerous other intermediate-density liquids may be employed in accordance with the invention, including organic liquids and aqueous solutions of inorganic and organic compounds that have a density intermediate between the anion- and cation-exchange resins. The only essential for such a liquid is that it not damage the resin.

A particularly suitable intermediate-density liquid is an aqueous solution of sodium sulfate. Although such a solution converts the anion-exchange resin to the sulfate form, sulfate anions are readily removed by regeneration with a suitable regenerant such as sodium hydroxide. As previously mentioned, the most preferred intermediate-density liquid is an aqueous solution of sodium hydroxide, which simultaneously regenerates the anion-exchange resin and permits separation of the contaminant cation-exchange resin.

In the preferred embodiment of the invention, the intermediate-density liquid is withdrawn from the contaminant separation zone at a rate of 5 to 20 times the rate at which the liquid is delivered to the zone. A preferred delivery rate for the regenerant is about 0.2 to 0.4 gallons per minute per square foot of upper or top surface of the bed of resin. Thus, the intermediate-density liquid will be withdrawn at a rate of about one to eight gallons per minute per square foot of upper surface of the bed. The delivery and withdrawal rates are controlled so that a gap containing liquid only is always maintained between the floating mass of anion-exchange resin and the cation-exchange resin that sinks to the bottom of the zone.

As those skilled in the art will realize, a wide variety of tank and column arrangements may be employed to carry out the method of the present invention. An example of a suitable arrangement is shown and described in U.S. Pat. No. 3,585,127, issued June 15, 1971, which is assigned to the assignee of this application.

The drawings show a diagrammatic illustration of an overall ion exchange system which is suitable for carrying out the present invention. For simplicity of illustration, these drawings are in flow sheet form, it being understood that connection between the various columns or tanks may be obtained by suitable piping. Each of these columns or tanks defines a suitable zone for the treatment of ion exchange resins. Thus, in the embodiment shown, there is a service column defining a service zone 10, a separation column defining a bulk resin separation zone 12, a contaminant separation column defining a contaminant separation zone 14, and a holding column defining a holding zone 16. In a system of the type illustrated, there will ordinarily be a plurality of service columns, forming a plurality of service zones 10, which are taken out of service one at a time for regeneration of the exhausted ion exchange resins. However, for simplicity, the embodiment shown in the drawings employs only one service zone 10.

FIG. 1 shows the initial transfer step, wherein the mixed bed of completely or partially exhausted cation- and anion-exchange resins is transferred from the service zone 10 to the bulk resin separation zone 12. The mixed resins in the separation zone 12 are indicated by reference numeral 18.

Figure 2:
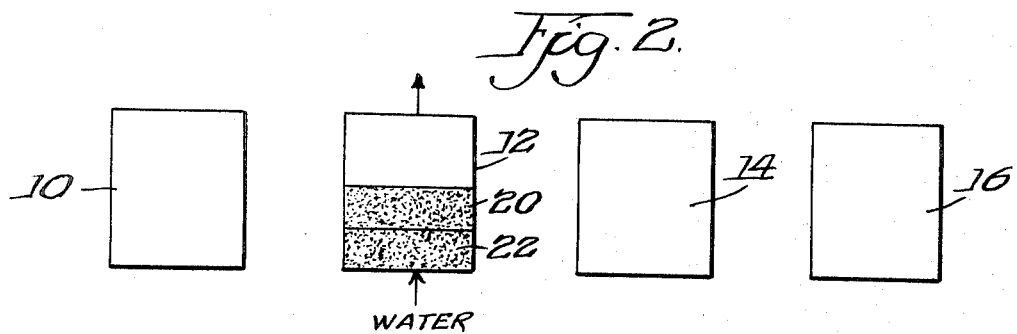

Referring to FIG. 2, after the mixed resins 18 are transferred to the separation zone 12, the resins are stratified by passing a liquid upwardly through the resins. This liquid will ordinarily be water, and is delivered upwardly through the resins at a rate that is sufficient to stratify the resins by carrying the less dense anion resin to a position above the cation-exchange resin. The resins are shown in stratified condition in FIG. 2, with the anion resin 20 on top and the cation resin 22 forming a lower layer.

Figure 3:
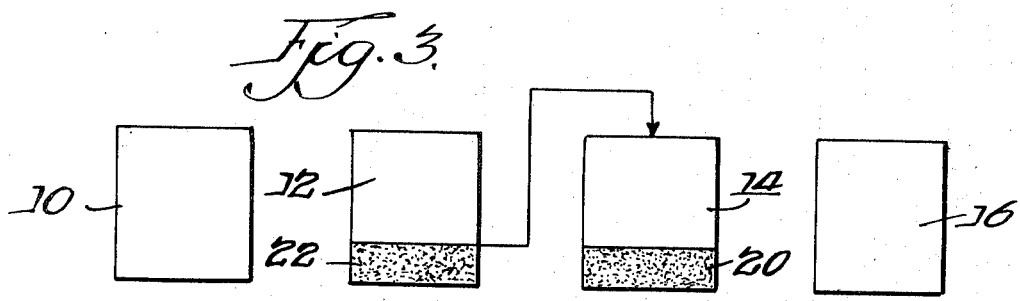

Subsequent to the stratification, the resins are isolated from one another. In the preferred embodiment, the isolation is accomplished by transferring the anion-exchange resin 20 to the contaminant separation zone 14, as shown in FIG. 3. At this point, both the anion-exchange resin 20 and the cation-exchange resin 22 will contain entrained water as a result of the above-described stratification.

Although the drawings show a sharp interface between the anion- and cation-exchange resins 20, 22, respectively, in the separation column 12, in actual practice such a sharp interface is not formed. Accordingly, the transfer of anion resins as shown in FIG. 3 may be performed at various positions in the bulk resin separation zone 12, according to whether it is desired to transfer an anion-rich cut, a cation-rich cut, or something between the two. That is, the higher the communication point of the transfer pipe with the bulk resin separation zone 12, the more anion-rich the cut will be. It is generally preferred to transfer a cation-rich cut, i.e., a cut that transfer most of the resin in the interface area to the contaminant separation zone 14. However, this is not essential.

Figure 4:
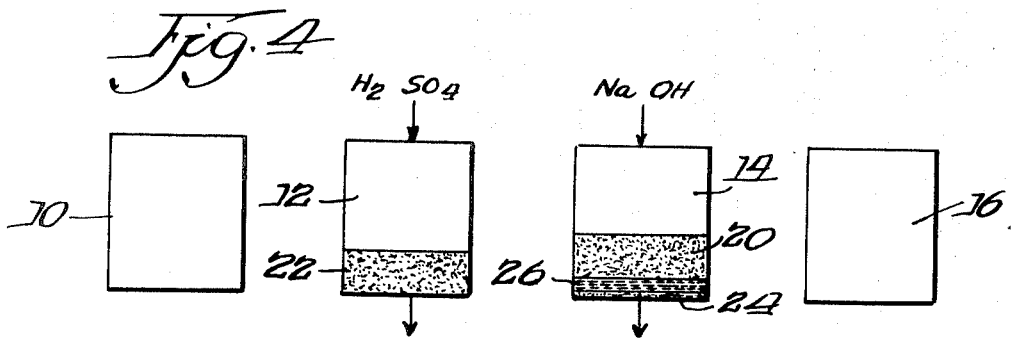

Referring to FIG. 4, an intermediate-density liquid is next delivered to the anion-exchange resin in the contaminant separation zone 14. This intermediate-density liquid causes the anion-exchange resin 20 to float, while permitting at least a portion of the contaminant cation-exchange resin 24 to sink to the bottom of the contaminant separation zone 14. In accordance with the present invention, no intermediate-density liquid is withdrawn from a lower portion of the contaminant separation zone 14 during the initial delivery phase. Instead, sufficient intermediate-density liquid is delivered to the zone 14 to produce a separation or gap containing liquid only between the anion-exchange resin 20 and the contaminant cation-exchange resin 24 which settles out. This gap is indicated in FIG. 4 by reference numeral 26.

After a given period of time, sufficient intermediate-density liquid is delivered to the zone 14 to produce a relatively large gap 26. At this point, a drain in the bottom of the zone 14 is opened, the intermediate-density liquid is permitted to flow out of the bottom of the zone at a rate about 5 to 20 times the rate at which the liquid is delivered to the zone. This aids in breaking up the mass of resin 20, and in releasing cation-exchange resin 24, which sinks to the bottom of the zone 14. The delivery and drain flow rates are regulated so that the anion-exchange resin 20 does not come into contact with the cation-exchange resin 24 that has settled out, and a gap is maintained at the end of each liquid withdrawal cycle. That is, the drain is closed before the anion- exchange resin 20 contacts the cation-exchange resin 24. The foregoing process is repeated numerous times in order to insure that all of the entrained cation-exchange resin 24 is released from the anion-exchange resin 20, and, in the instance where the intermediate-density liquid is sodium hydroxide, that all of the entrained water in the resin mass is replaced by the sodium hydroxide solution so that the anion-exchange resin 20 is efficiently and thoroughly regenerated.

As shown in FIG. 4, the cation-exchange resin 22 in the bulk resin separation zone 12 is also regenerated with a suitable regenerant. For purposes of illustration, the regenerant indicated in FIG. 4 is sulfuric acid. As those skilled in the art will realize, other suitable regenerants may be employed, and the particular regenerant used forms no part of the present invention.

Figure 5:
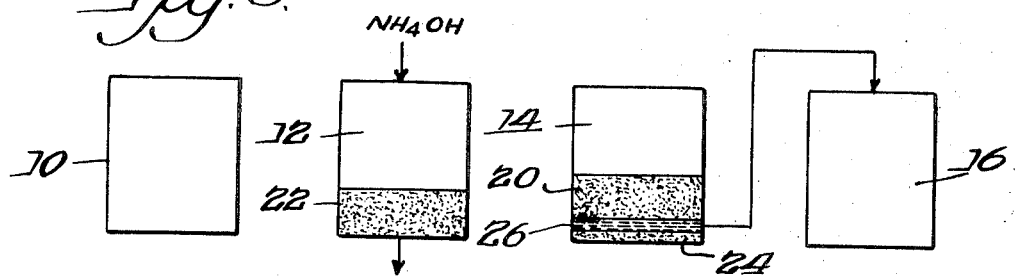

Referring to FIG. 5, if it is desired to ammoniate the cation-exchange resin, ammonium hydroxide may be passed through the resin in the bulk resin separation zone 12 at this time.

As shown in FIG. 5, the anion-exchange resin 20 is transferred to the holding zone 16. This transfer is preferably accomplished by means of a transfer pipe that communicates with the anion regeneration zone 14 at a point that intercepts the gap 26 between the anion exchange resin 20 and the contaminant cation-exchange resin 24.

Figure 6:
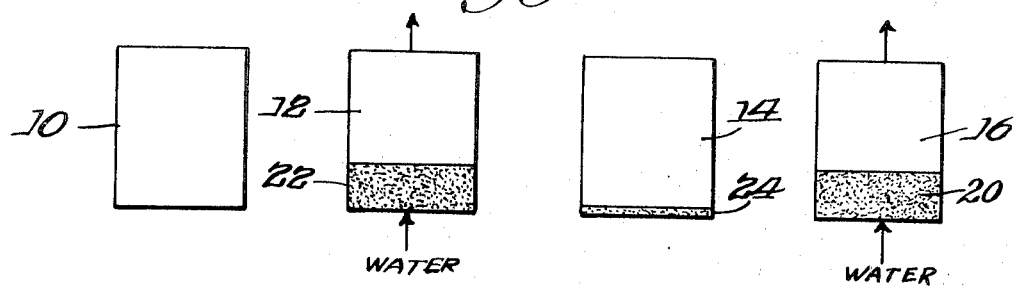
Figure 7:
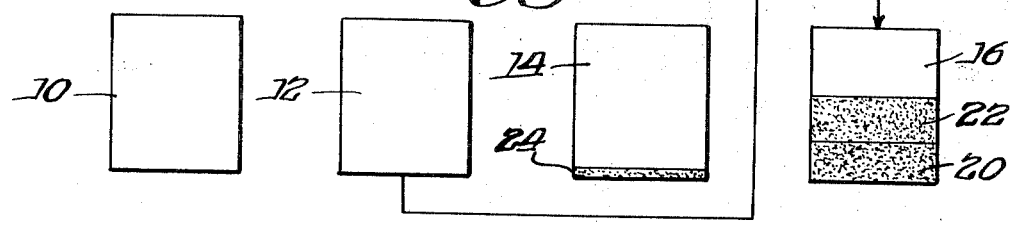

Referring to FIG. 6, the anion- and cation-exchange resins 20, 22, respectively, are rinsed. If a non-regenerant intermediate-density liquid had been employed (e.g. sodium sulphate), the resin would be regenerated in the holding zone 16 at this time. This regeneration would, of course, be followed by a rinsing step. Referring to FIG. 7, the cation-exchange resin 22 in the bulk resin separation zone 12 is now transferred to the holding zone 16, where it is mixed with the anion-exchange resin 20.

Figure 8:
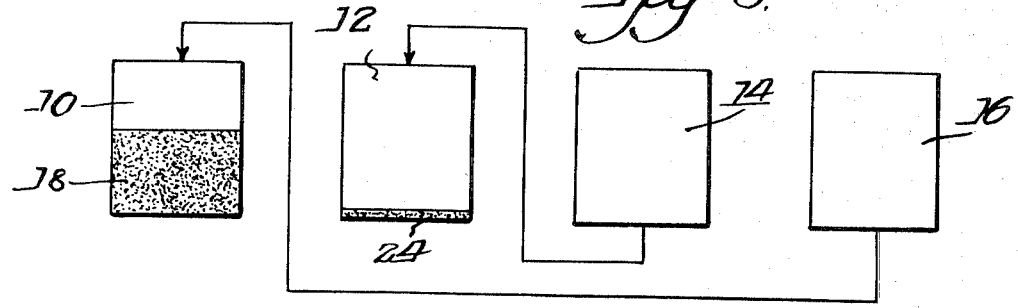

As shown in FIG. 8, the mixed resins in the holding zone 16 are next returned to the service column 10. Also, the contaminant cation-exchange resin 24 is transferred from the contaminant separation zone 14 to the separation zone 12, where it will be mixed with the next batch of exhausted resin. In FIG. 8, the system is ready for delivery of another charge of exhausted resins from another service zone 10 to the bulk resin separation zone 12.

The density of the intermediate-density liquid employed in the present invention depends upon the densities of the particular anion- and cation-exchange resins that are being employed. The only essential factor is that the density of the intermediate-density liquid be between the densities of the anion- and cation-exchange resins. As a general matter, the intermediate density liquid should have a specific gravity between about 1.088 and 1.17.

The manner of transferring resins between zones in the foregoing description is familiar to those skilled in the art and any of the conventional methods may be employed. For example, water pressure, air pressure, or combinations of the two are highly suitable.

The method of the present invention is adaptable to use with a wide variety of anion- and cation-exchange resins, the only essential being is that they differ in density. Typical solid cation-exchange resins that may be employed in the present invention are those of the divinyl-benzene-styrene copolymer type, the acrylic type, the sulfonated coal type, and the phenolic type. Typical solid anion-exchange resins that may be employed in the present invention are the phenol-formaldehyde type, the divinylbenzene-styrene type, the acrylic type, and the epoxy type. The anion- and cation-exchange resins are both preferably employed as beads in the size range of about 16–60 mesh. Suitable bead resins are sold under the trade names Amberlite, Duolite, and Dowex. Particularly suitable cation-exchange resins are sold under the trade names Amberlite IR–200 and IR–120, Duolite ES–26, and Dowex HCR–W. Suitable anion-exchange resins are sold under the trade names Amberlite IRA–900 and IRA–400, and Duolite ES–109, and Dowex SBR.

The following examples are intended to illustrate the present invention, and should not be construed as limitative, the scope of the invention being determined by the appended claims.

EXAMPLE I

A service column forming part of a water treatment system for a condensate water recirculation system was charged with 100 cubic feet Amberlite IRA–400 anion-exchange resin and 200 cubic feet of Amberlite IR–200 cation-exchange resin. After the resins were exhausted, they were transferred to a separation column under the influence of both air and water pressure. The resins were separated in the separation column with an upflow of liquid delivered at a rate of 4 gallons per minute per square foot of resin upper surface area. This resin area is measured at the top of the resin bed, perpendicularly to the flow of water.

Subsequent to the separation, the upper layer of anion-exchange resin, along with some contaminant cation-exchange resin, was transferred to a contaminant separation column. This resin was backwashed in order to clean it, at a backwash rate of 4 gallons per minute per square foot. The water was then drained from the contaminant separation column to below the level of the bed.

A 16% solution of sodium hydroxide having a specific gravity of 1.16, was introduced into the contaminant separation column at 120° F. The sodium hydroxide solution was continuously introduced at a rate of 11.1 gallons of solution per minute over a period of 70 minutes. During introduction of the sodium hydroxide, after 10 minutes had elapsed, the drain valve was opened, and the liquid was withdrawn from a lower portion of the column at a rate of 78 gallons of solution per minute for 0.3 minute. The drain was then closed for 2.2 minutes, and was again reopened, and liquid was again withdrawn at a rate of 78 gallons per minute for 0.3 minute. The foregoing was repeated a total of 22 times, until the resin was completely regenerated. At the end of the process, the drain valve was regulated to maintain the anion-exchange resin at 9 inches above the contaminant cation-exchange resin.

The regenerated anion-exchange resin was next transferred to a holding column. This transfer was accomplished through a pipe that communicated with the contaminant separation column at a level even with the gap produced by the sodium hydroxide solution between the anion-exchange resin and the contaminant cation-exchange resin. Thus, all of the contaminant cation-exchange resin that had sunk to the bottom of the column was left behind. The anion-exchange resin was rinsed in the holding column.

The cation-exchange resin was regenerated with sulfuric acid in the separation column, and then rinsed and transferred to the holding column where the cation- and anion-exchange resins were mixed. The mixed resins were then transferred to the service column.

The contaminant cation-exchange resin in the contaminant separation column was rinsed with water and transferred to the separation column, where it was available to be mixed with the next charge of the mixed exhausted resins.

In operation, the service column showed very low sodium leakage (in the range of 1–5 parts per billion), even when the resin was converted to the ammonium form by the introduction of 1–2 p.p.m. ammonium hydroxide into the water being treated.

EXAMPLE II

Example I was repeated, except with 200 cubic feet of Dowex HCR-W cation-exchange resin and 100 cubic feet of Dowex SBR anion-exchange resin were employed. Rather than introducing concentrated sodium hydroxide into the anion-exchange resin in the contaminant separation column, the 14% solution of sodium sulfate was employed. This solution was introduced at 70° F., and had a specific gravity of 1.13. The sodium sulfate solution was introduced at a rate of 175 pounds per minute over a periaod of 60 minutes. After 9 minutes had elapsed, the drain valve was opened, and the sodium sulfate solution was withdrawn from a lower portion of the column at a rate of 735 pounds per minute. The drain valve was then closed, while the introduction of sodium sulfate was continued. The foregoing intermittent withdrawal of sodium sulfate was repeated 14 times, and at the end of the process, the drain valve was regulated to maintain the anion-exchange resin at 6 inches above the contaminant cation-exchange resin.

The anion-exchange resin was separated from the contaminant cation-exchange resin and transferred to a holding column by taking a cut in the gap between the resins as in Example I. The anion-exchange resin was rinsed with 50 gallons of demineralized water per cubic foot of resin. The resin was then regenerated by introducing an 8% solution of sodium hydroxide at 120° F. After regeneration, the holding column was drained and rinsed. The subsequent steps were identical to those set forth in Example I.

Again, it was noted that the service column operated with resins regenerated in the manner indicated showed very low leakage.

Obviously, many modifications and variations of the invention as hereinbefore set forth will occur to those skilled in the art, and it is intended to cover in the appended claims all such modifications and variations as fall within the true spirit and scope of the invention.

I claim:

1. In the separation of contaminant cation-exchange resin from anion-exchange resin in a contaminant separation zone by delivering an intermediate-density liquid to said resins in an amount sufficient to permit said anion-exchange resin to float and said contaminant cation-exchange resin to sink, said intermediate-density liquid having a density intermediate between the densities of said anion-exchange resin and said cation-exchange resin, the improvement comprising: producing intermittent periods of high liquid flow rate through the resin to break up the mass of said resin so that entrained cation exchange resin is released by continuously delivering said intermediate-density liquid to said resin; and intermittently withdrawing said liquid from a lower portion of said zone while controlling the rates of delivery and withdrawal of said intermediate-density liquid so that a gap containing liquid only is maintained between said anion-exchange resin and said cation-exchange resin.

2. The method as defined in claim 1 wherein said intermediate-density liquid is an aqueous solution of sodium hydroxide.

3. The method as defined in claim 2 wherein said sodium hydroxide has a concentration of about 10% to about 20% by weight.

4. In the separation of contaminant cation-exchange resin from anion-exchange resin in a contaminant separation zone by delivering an intermediate-density liquid to said resins in an amount sufficient to permit said anion-exchange resin to float and said contaminant cation-exchange resin to sink, said intermediate-density liquid having a density intermediate between the densities of said anion-exchange resin and said cation-exchange resin, the improvement comprising: continuously delivering said intermediate-density liquid to said resin; and intermittently withdrawing said liquid from a lower portion of said zone at a rate of about 5 to 20 times the rate at which said liquid is delivered to said zone while controlling the rates of delivery and withdrawal of said intermediate-density liquid so that a gap containing liquid only is maintained between said anion-exchange resin and said cation-exchange resin.

5. The method as defined in claim 4 wherein said liquid is an aqueous solution of sodium hydroxide.

6. The method as defined in claim 5 wherein said liquid is delivered to said zone at a rate of about 0.2 to 0.4 gallons per minute per square foot of upper surface of said bed.

7. The method as defined in claim 5 wherein said sodium hydroxide has a concentration of about 10% to about 20% by weight.

8. The method as defined in claim 7 wherein said liquid is delivered to said zone at a rate of about 0.2 to 0.4 gallons per minute per square foot of upper surface of said bed.

References Cited

UNITED STATES PATENTS 3,582,504   6/1971   Salem et al.

MELVIN GOLDSTEIN, Primary Examiner

U.S. Cl. X.R.

210—33